United States Patent [19]

Jayawant et al.

[11] 4,083,941

[45] Apr. 11, 1978

[54] PURIFICATION OF ANHYDROUS HYDROGEN FLUORIDE

[75] Inventors: Madhusudan Dattatraya Jayawant, Hockessin, Del.; Geoffrey Walsh Meadows, Kennett Square, Pa.

[73] Assignee: E. I. Du Pont de Nemours and Company, Wilmington, Del.

[21] Appl. No.: 788,670

[22] Filed: Apr. 18, 1977

[51] Int. Cl.$^2$ .............................................. C01B 7/22
[52] U.S. Cl. ................................... 423/488; 423/483; 423/484
[58] Field of Search ................... 423/484, 488, 483

[56] References Cited

U.S. PATENT DOCUMENTS 3,166,379  1/1965  Bradley et al. ................. 423/484
3,689,370  9/1972  Osaka et al. ................. 423/484 X

FOREIGN PATENT DOCUMENTS 1,174,382  12/1969  United Kingdom ............. 423/484
342,831  7/1972  U.S.S.R. ..................... 423/484

*Primary Examiner*—Edward Stern

[57] ABSTRACT

A process for preparing very high purity anhydrous hydrogen fluoride by contacting anhydrous hydrogen fluoride with at least 2.3% by weight of persulfuric acid based on the anhydrous hydrogen fluoride or at least 0.7% by weight of hydrogen peroxide based on the anhydrous hydrogen fluoride at ambient temperature and either at least 0.6% by weight of methanol based on the anhydrous hydrogen fluoride or at least one mole of sulfuric acid per mole of hydrogen peroxide at a temperature of from 0° to 75° C and distilling the resulting mixture to recover very high purity anhydrous hydrogen fluoride.

16 Claims, No Drawings

PURIFICATION OF ANHYDROUS HYDROGEN FLUORIDE

BACKGROUND OF THE INVENTION

1. Field of the Invention

This invention relates to a process for the preparation of pure anhydrous hydrogen fluoride from anhydrous hydrogen fluoride. More specifically, this invention relates to a process which comprises treating anhydrous hydrogen fluoride sequentially with hydrogen peroxide and methanol or sulfuric acid prior to distillation and recovering anhydrous hydrogen fluoride with reduced impurities after distillation.

2. Prior Art

Anhydrous hydrogen fluoride is formed by heating a mixture of fluorspar and sulfuric acid. The main impurities in the thus prepared hydrogen fluoride are fluosulfonic acid, silicon tetrafluoride, sulfur dioxide, sulfuric acid and water. These impurities are usually removed by fractional distillation and the resulting hydrogen fluoride has a purity of about 99.8% or better. However, hydrogen fluoride thus produced usually also contains minor amounts of certain other undesirable impurities which include arsenic and sulfite ions. In the electronics industry, aqueous solutions of hydrogen fluoride are used as cleaning agents and etchants in the production of semiconductors, diodes and transistors. A high degree of purity and extremely low levels of the above impurities are required to prevent minute quantities of said impurities from remaining on the surface of said electronic industry products after they have been etched or cleaned with the hydrogen fluoride, thereby adversely affecting their function.

Several processes have been proposed for the preparation of high purity hydrogen fluoride which substantially reduce the presence of the undesirable impurities referred to above. Among such are processes that involve repeated fractional distillation in fluoroplastic equipment. However, such methods are suitable only for the preparation of small quantities of high purity hydrogen fluoride and not considered to be economical for producing commercial quantities. U.S. Pat. 3,166,379 discloses a more attractive process from the standpoint of commercial utility which is based on the conversion of the impurities to nonvolatile products by oxidizing said impurities with permanganate or chromate salts and recovering pure hydrofluoric acid with decreased impurities by simple distillation. Such an oxidation process is suitable for the purification of aqueous hydrofluoric acid but it suffers from the drawback that when anhydrous hydrogen fluoride is distilled in the presence of permanganate or chromate salts, volatile manganese or chromium compounds contaminate the distillate. Thus, for example, although the arsenic and sulfite levels are greatly decreased, the presence of large amounts of manganese or chromium, 100 ppm or higher, renders the hydrogen fluoride unsuitable for electronic and other applications which require a high degree of HF purity. A solution to this problem is claimed in U.S. Pat. No. 3,689,370 which describes a process involving the addition of an inorganic ferrous salt to the anhydrous hydrogen fluoride after the permanganate or chromate treatment to reduce excess oxidizing agents. However, this process results in a high level of iron contamination. Allowed U.S. application Ser. No. 634,438, filed Nov. 24, 1975, by Geoffrey W. Meadows, now U.S. Pat. No. 4,032,621, issued June 28, 1977 solves the iron contamination problem by a process comprising contacting the anhydrous hydrogen fluoride with a permanganate or dichromate and then reducing the excess permanganate or dichromate with a heavy metal free reducing agent and then distilling the resulting mixture.

R. Osicki in *Przemysl Chem.* 42, 32–3 (1963) discloses a 30% $H_2O_2$ and $Ba(OH)_2$ addition to aqueous hydrogen fluoride and isothermal distillation to remove Mn, Cu, Al, As, Ca and Na. However, sulfite is not removed, the starting hydrogen fluoride is not anhydrous and the main accomplishment is the removal of iron. W. Roland et al. in East German Patent 62,309 (June 20, 1968) discloses 80% or 100% HF stirred with either 30% or 5% $H_2O_2$ at 25° to 30° C followed by HF distillation. This procedure, however, does not sufficiently reduce sulfite ions.

SUMMARY OF THE INVENTION

Now in accordance with the invention a process for the preparation of pure anhydrous hydrogen fluoride with decreased amounts of arsenic and sulfite impurities has been discovered which does not introduce new impurities via the reagents used, said process comprising contacting anhydrous hydrogen fluoride having arsenic and sulfite impurities with at least 2.3% by weight of persulfuric acid based on the anhydrous hydrogen fluoride or at least 0.7% by weight of hydrogen peroxide based on the anhydrous hydrogen fluoride and either at least 0.6% by weight of methanol based on the anhydrous hydrogen fluoride or at least one mole of sulfuric acid per mole of hydrogen peroxide, at a temperature of from 0° to 75° C, distilling the resultant mixture and recovering a very high purity anhydrous hydrogen fluoride with decreased arsenic and sulfite impurities in the distillate.

Thus, the process of the present invention involves first contacting anhydrous hydrogen fluoride containing arsenic and sulfite impurities with at least 0.7% by weight of hydrogen peroxide and then contacting the hydrogen peroxide and anhydrous hydrogen fluoride with either at least 0.6% by weight of methanol based on the anhydrous hydrogen fluoride or at least one mole of $H_2SO_4$ per mole of hydrogen peroxide at a temperature of from 0° to 75° C followed by distillation and recovery of the hydrogen fluoride with substantially less of the aforesaid impurities.

The process of the present invention also involves contacting anhydrous hydrogen fluoride containing arsenic and sulfite impurities with at least 2.3% preferably 2.3 to 5% by weight of persulfuric acid based on the anhydrous hydrogen fluoride at a temperature of from 0° to 75° C, distilling the resultant mixture and recovering anhydrous hydrogen fluoride with decreased arsenic and sulfite impurities.

In the present application reference to anhydrous hydrogen fluoride means hydrogen fluoride that is at least 97% by weight hydrogen fluoride. Hydrofluoric acid means aqueous hydrofluoric acid containing more than 30% water.

Hydrogen fluoride is made from fluorspar, a naturally occurring calcium fluoride by reaction with sulfuric acid. Anhydrous hydrogen fluoride is used as a cleaning agent and etchant in the electronics industry. However, in such application, the concentrations of impurities such as arsenic and sulfite must be very low. Generally based on 49% hydrogen fluoride the arsenic level must be no more than 0.03 ppm and the combined sulfite and sulfate no more than 3 ppm. The degree to which these impurities are present in commercial or normally available anhydrous hydrogen fluoride depends largely on the source of fluorspar. In commercial manufacture, technical grade anhydrous hydrogen fluoride is finally purified by one or two distillation steps which do not sufficiently reduce the concentration of the aforesaid impurities to levels acceptable in electronics uses. The process of the present invention removes impurities such as arsenic and sulfite that are not effectively removed by said conventional distillation.

The arsenic and sulfite impurities in commercial anhydrous hydrogen fluoride rarely exceed 0.05% and usually are less than 0.01%. Accordingly, the stoichiometric amount of oxidizing agent required is not great. However, a large excess of $H_2O_2$ has been found to be necessary in order to achieve the desired low levels of arsenic and sulfite in the purified HF.

The amount of persulfuric acid required may vary widely. The concentration of the persulfuric acid used should be such to minimize the presence of water in the distillation step.

What is meant by persulfuric acid is $H_2SO_5$. Persulfuric acid may be prepared by combining the sulfuric acid and hydrogen peroxide of this invention described herein.

The amount of hydrogen peroxide required depends on the amount of impurities present in the hydrogen fluoride. The hydrogen peroxide amount referred to herein of at least 0.7% by weight based on the anhydrous hydrogen fluoride is based on 100% hydrogen fluoride. Less than 0.7% by weight will not reduce the sulfite and arsenic impurities sufficiently. The upper level of hydrogen peroxide is limited only by convenience and economy. The preferred amount of hydrogen peroxide is from 0.7% to 1.5% by weight.

What is meant by sulfite content as used herein is the combined amount of sulfite and sulfate present in the anhydrous hydrogen fluoride although in some instances both sulfite and sulfate are specifically mentioned.

Hydrogen peroxide of up to 70% by weight is commercially available. Generally in attaining the levels of hydrogen peroxide required in the process of this invention, hydrogen peroxide of from 50% to 70% by weight in water may be used. The concentration of the hydrogen peroxide used should be such to minimize the presence of water in the distillation step.

The hydrogen peroxide treatment or oxidation reaction of the present invention may take place at ambient temperatures or from 0° to 75° C, preferably at from 0° to 20° C. Said treatment is conducted with hydrogen fluoride under reflux or nonreflux conditions with some agitation by a stream of inert gas bubbles or a suitable stirring device. Oxidation is usually complete more rapidly as the temperature is increased. The boiling point of hydrogen fluoride is about 20° C and pressurized equipment is required if higher temperatures are used. However, when convenient, the hydrogen peroxide aqueous solution may also be added to an empty vessel or tank car of transport and the anhydrous hydrogen fluoride added thereto or the hydrogen peroxide may be added together with the anhydrous hydrogen fluoride to said vessel or tank car. In the period of time of at least 20 hours, often required for transportation of the car to its destination, with only the agitation due to movement during transportation at ambient temperatures the reaction with hydrogen peroxide is complete.

Since the period of time is dependent on the temperature of the liquids being mixed or contacted, it will be understood that the contact time can vary very widely. At higher temperatures the contact time will be very low, e.g., 1 to 2 hours. Similarly at lower temperatures the time of contact can be very long, e.g., several days. Under ambient temperatures associated with winter, the contact time may be in the range of 20 to 80 hours. Thus, depending on the temperature, the contact time can range from 1 to 80 hours on a batch basis. Thus, the period of time is whatever is required at a given temperature to convert essentially all of the arsenic.

Although hydrogen peroxide does not oxidize the volatile arsenic impurity in anhydrous hydrogen fluoride as rapidly as potassium permanganate, unlike potassium permanganate it does not form a contaminating byproduct. Hydrogen peroxide is readily available and forms only water as a byproduct. Relatively high concentrations of hydrogen peroxide are, however, required. Based on the equation for the oxidation of $As^{3+}$ to $As^{5+}$

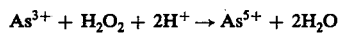

$$As^{3+} + H_2O_2 + 2H^+ \rightarrow As^{5+} + 2H_2O$$

about 400 times the stoichiometric amount required to oxidize the arsenic originally present in the anhydrous hydrogen fluoride is required. In order to reduce the arsenic to levels within the range set for electronic applications (less than 0.03 ppm in 49% HF) a large excess of hydrogen peroxide is required.

The main impurity in commercially available anhydrous hydrogen fluoride, besides arsenic, is sulfite and sulfate. The use of hydrogen peroxide alone does not reduce the sulfite and sulfate content of the anhydrous hydrogen fluoride sufficiently to make it acceptable for electronic uses. However, the subsequent treatment with methanol or sulfuric acid followed by distillation results in an anhydrous hydrogen fluoride within the limits of sulfite and sulfate set for electronic applications. Thus, methanol or sulfuric acid is added to the treated anhydrous hydrogen fluoride to reduce the sulfite level.

An aqueous solution of formaldehyde may also be used, but because of undesirable properties, which include the availability of formaldehyde in only up to 37% concentration in water, formaldehyde is not preferred.

The methanol is added to the anhydrous hydrogen fluoride and hydrogen peroxide mixture and agitated to insure adequate contacting of the methanol and the mixture. The methanol may alternatively be injected into the line used to unload the tank car of treated anhydrous hydrogen fluoride. Premixing of the methanol and hydrogen peroxide prior to the addition to the anhydrous hydrogen fluoride is hazardous and should be avoided.

Sulfuric acid is also effective in the present invention in reducing the sulfite impurity of anhydrous hydrogen fluoride after the herein described treatment with hydrogen peroxide. The sulfuric acid is reagent grade of a purity that would not introduce enough water to greatly affect the hydrogen fluoride liquid-vapor equilibrium. Generally 95% purity or greater is desirable. The amount of sulfuric acid required is at least one mole of sulfuric acid (100% basis) per mole of hydrogen peroxide. Generally an amount of from 1 to 5 moles per mole of hydrogen peroxide is used. Preferably this amount is 1.5 to 5 moles. The most preferred amount of sulfuric acid is from 1.2 moles to 3 moles per mole of hydrogen peroxide.

The purification of anhydrous hydrogen fluoride by treatment with a mixture of potassium persulfate, potassium sulfate and potassium bisulfate and then distillation gave only a minor decrease in arsenic content (25 ppm decreased to 9.4 ppm on a 49% hydrogen fluoride basis). Treatment of anhydrous hydrogen fluoride with 6% potassium peroxydisulfate decreased the arsenic content to 0.22 ppm which was still considerably higher than the desired arsenic level of 0.03 ppm or less. It seemed, therefore, that the salts of persulfuric acids were not effective enough to oxidize the arsenic impurity in anhydrous hydrogen fluoride. It was found, however, that when sulfuric acid was added to the oxidized reaction mixture of anhydrous hydrogen fluoride and hydrogen peroxide, that the arsenic and sulfite was effectively reduced to the level desired.

Methanol has been found to be particularly effective in the process of the present invention in reducing the sulfite contaminant of the anhydrous hydrogen fluoride. Although formaldehyde will also remove the sulfite contaminant, methanol is advantageous due to its lower water content. The amount of water introduced with methanol is not sufficient to greatly affect the hydrogen fluoride liquid-vapor equilibrium. Additionally, methanol contains few undesirable impurities. Sufficient methanol should be added to reduce the sulfite content to that required for electronic usage. Generally, an excess of methanol over the amount of unreacted hydrogen peroxide is not required. Thus, from 0.6 to 2% by weight of methanol based on the anhydrous hydrogen fluoride is a sufficient amount. Preferably from 0.6 to 1% by weight of methanol is used. The process of the present invention is accomplished without introduction of undesirable contaminants which are volatile in an essentially anhydrous system. Following the addition of the methanol the hydrogen fluoride may be stirred or maintained under reflux for a few minutes prior to distillation. Since the impurities are converted to residues with low volatility compared to hydrogen fluoride, elaborate fractionation is not necessary to separate said impurities in the present process. Thus, distillation at either atmospheric or higher pressure is effectively conducted in a column with an efficiency of one theoretical plate or less.

The process of the invention must be conducted in equipment which is not attacked by anhydrous hydrogen fluoride to avoid contamination by extraneous material. Thus all surfaces of the distillation vessel, column, column packing, condenser and receiver which come into contact with hydrogen fluoride must be inert towards it. Suitable materials of construction are metals such as low carbon steel, nickel and nickel alloys such as Inconel, Hastalloy Alloys B, C and D, Carpenter 20, Durimet 20 and platinum. Of these, low carbon steel is preferred from the standpoint of economy. Stainless steels are generally not suitable due to the possibility of trace contamination from alloy constituents. Polymeric materials such as polyethylene, unplasticized polyvinyl chloride and fluorocarbon polymers such as Teflon ® can also be used, and of these Teflon ® or similar fluorocarbon polymers are preferred.

Although the process of the invention is primarily directed to the preparation of very pure anhydrous hydrogen fluoride for critical uses, such as those in the electronics field, it also results in the production of technical grade hydrogen fluoride of improved quality.

The anhydrous hydrogen fluoride purified in the process of the present invention is anhydrous hydrogen fluoride having a concentration of at least about 97% by weight hydrogen fluoride.

In the following examples which further illustrate the invention all references to parts and percentages are by weight unless otherwise indicated. The commerical anhydrous hydrogen fluoride used in all the following examples was tested for arsenic and sulfite and sulfate based on 49% hydrogen fluoride and found to contain 25 ppm of arsenic and 25 ppm of sulfite and sulfate.

EXAMPLE 1

This example illustrates the use of hydrogen peroxide to decrease the arsenic level of commercial anhydrous hydrogen fluoride to meet the electronic grade specification.

The equipment used for the purification of anhydrous hydrogen fluoride consisted of a cold-rolled mild steel distillation vessel 3 inch I.D., 8 inch deep and ¼ inch wall thickness immersed in a heating bath. A mild steel head was attached to the distillation vessel by a ¼ inch clamped flange sealed by a Teflon ® gasket. A mechanical stirrer with the stirrer shaft passing through a Teflon ® bearing in the head was used to mix reagents added to HF in the distillation vessel. The head carried four threaded inlets to which were connected a distillation column, a thermocouple well, a sample inlet-port fitted with a Teflon ® septum and an HF cylinder when the vessel was being charged. All surfaces contacting HF were either mild steel or Teflon ® and threaded connections were sealed with Teflon ® pipe tape.

The distillation column consisted of a 12 inches long, ½ inch diameter mild steel pipe packed with mild steel turnings. The column was connected by a tee and elbow to a 18 inches long ½ inch diameter mild steel pipe which served as a condenser and the distillate was collected in a Teflon ® dropping funnel. The column and condenser were water jacketed and the receiver was cooled in an ice water bath. The temperature in the column jacket was controlld by circulating water from a reservoir maintained at the desired temperature and refrigerated water was supplied to the condenser jacket. The temperature in the distillation vessel was measured by a iron/constantan thermocouple enclosed in a steel well with the tip positioned ¼ inch from the bottom of the vessel. The column head temperature was similarly measured at the center of the tee side arm at the top of the condenser.

600 parts of hydrogen fluoride (commercial anhydrous) was charged to the distillation vessel, cooled to 0° C in an ice water bath. 7.7 parts of 70% hydrogen peroxide (sp. gr. 1.284 g/ml) were injected from a 10 ml syringe using a hypodermic needle to penetrate the Teflon ® septum on the vessel head. The hydrogen fluoride was stirred for two hours during which time the temperature increased to 10° C. The temperature was then maintained at 10° to 13° C without stirring for 68 hours. The temperature was raised to 20.8° C. With the column jacket adjusted to 21.5° C and the condenser jacket to 5° C, distillation of hydrogen fluoride commenced. The temperature in the distillation vessel was gradually increased to 22.8° C and the column jacket temperature to 23.5° C over a period of four and a half hours and 370 parts hydrogen fluoride was collected.

An aqueous solution of hydrogen fluoride was prepared by slowly running the anhydrous HF collected in the Teflon ® dropping funnel, which served as a receiver, onto pure ice made from distilled double deionized water. The strength of the solution was adjusted to 49% on a weight basis by adding the required amount of pure water.

The aqueous HF was analyzed for arsenic by reducing arsenic impurities to arsine with hydrogen, absorbing the arsine from the hydrogen gas stream in a pyridine solution of silver diethyldithiocarbamate to form a colored complex, and measuring the absorbance spectrophotometrically. Sulfur impurities were oxidized with hydrogen peroxide to sulfate which was then determined turbidometrically after the addition of excess barium chloride. The analytical results were expressed as parts per million of arsenic and sulfite plus sulfate in 49% hydrogen fluoride.

The results obtained on the purified sample are summarized in Table 1. Comparison with the corresponding analyses on the commercial anhydrous hydrogen fluoride shows that the arsenic and sulfite plus sulfate impurity levels were substantially decreased by the purification procedure. The arsenic level was less than that required for electronic grade HF (0.03 ppm) whereas the sulfite plus sulfate level did not meet the specification (3 ppm).

EXAMPLE 2

This example illustrates treatment of commercial anhydrous hydrogen fluoride with hydrogen peroxide and methanol to decrease arsenic and sulfur impurity levels to meet electronic grade specifications.

600 parts of hydrogen fluoride (commercial anhydrous) was charged to the distillation vessel of the mild steel purification equipment described in Example 1. After charging the HF at 0° to 3° C, 7.7 parts of 70% hydrogen peroxide (sp. gr. 1.284 g/ml) were added as in Example 1 and the hydrogen fluoride was stirred for two hours at about 10° C. The temperature was then maintained at 10 to 20° C for 68 hours with stirring. Four parts of methanol, certified ACS grade, was added to the hydrogen fluoride in the distillation vessel by injection using a hypodermic needle through the Teflon ® septum on the vessel head. Hydrogen fluoride was then distilled at atmospheric pressure as described in Example 1 and 330 parts of anhydrous hydrogen fluoride was collected in the Teflon ® receiver.

A 49% aqueous solution was prepared as described in Example 1 and analyzed for arsenic and sulfite plus sulfate. The results are summarized in Table 1. Comparison with the corresponding analyses on commercial anhydrous hydrogen fluoride shows that the arsenic and sulfate plus sulfate impurity levels were greatly decreased by the purification procedure and both are less than the levels specified for electronic grade HF.

EXAMPLE 3

This further illustrates the hydrogen peroxide and methanol process for the removal of arsenic and sulfur impurities. Using the equipment and procedure of Example 2, 820 parts of hydrogen fluoride (commercial anhydrous) were treated with 10.2 parts of 70% hydrogen peroxide and held for 73 hours at 10° to 15° C before adding 5.5 parts of methanol and recovering 520 parts of anhydrous HF by distillation. Arsenic and sulfite plus sulfate analyses on an aqueous solution of the purified HF are shown in Table 1. The impurity levels were less than those specified for electronic grade HF.

EXAMPLES 4 and 5

These examples illustrate that if sufficient hydrogen peroxide is not added to the hydrogen fluoride the arsenic content of the purified HF exceeds the electronic grade specification.

The equipment was similar to that used in the preceding examples except for the mild steel distillation vessel which was 4¼ inch deep instead of 8 inches. The procedure was similar to that described in Example 1.

In Example 4, 2.6 parts of 70% $H_2O_2$ was added to 300 parts of commercial anhydrous hydrogen fluoride and held for 48 hours at 12° C prior to distillation. In Example 5, 1.3 parts of 70% $H_2O_2$ was added to 306 parts of commercial anhydrous hydrogen fluoride and held for 70 hours at 10° C prior to distillation.

Aqueous solutions of the anhydrous hydrogen fluoride were prepared as described in Example 1 and analyzed for arsenic and sulfite plus sulfate. The results are given in Table 1. The arsenic content of the purified HF increased as the $H_2O_2$ added was decreased relative to the HF.

Table 1

| Ex. No. | % $H_2O_2$ Based on HF | Temp. °C | Hold Time Hr. | % $CH_3OH$ Based on HF | Impurities ppm based on 49% HF | |
|---|---|---|---|---|---|---|
| | | | | | As | $SO_3 + SO_4$ |
| 1 | 0.90 | 10–13 | 70 | None | 0.02 | 6.9 |
| 2 | 0.90 | 10–20 | 71 | 0.65 | 0.02 | <1 |
| 3 | 0.87 | 10–15 | 73 | 0.67 | 0.03 | 2.5 |
| 4 | 0.60 | 12 | 48 | None | 0.21 | 3.3 |
| 5 | 0.29 | 10 | 70 | None | 7.6 | 3.4 |

EXAMPLE 6

This example illustrates the reduction of arsenic and sulfite impurities with hydrogen peroxide and sulfuric acid.

The equipment was constructed from Teflon ®. It consisted of a one liter round bottom distillation flask with a taper neck into which the lower end of the column fitted. An 8 mm I.D. closed end the passed through the wall of the flask with the tip of the tube positioned about half an inch from the bottom of the flask. This served as a sleeve for an iron/constantan thermocouple which was used to measure the pot temperature. The space between the inner wall of the Telfon ® tube and the thermocouple was filled with mercury to improve thermal contact. Anhydrous HF was charged to the pot by connecting a 500 ml steel cylinder containing the HF to a ¼ inch Teflon ® threaded tube connector attached to the distillation flask. After charging the HF, the connector on the distillation flask was closed with a cap provided with a Teflon ® septum. A Teflon ® coated magnet was sued to stir the contents of the distillation flask.

The column was a 12 inches I.D. Teflon ® tube packed for a length of 10 inches with Teflon ® shavings and jacketed with a 2½ inches diameter polythene cylinder. The jacket was provided with an inlet and an oulet for water circulation and a thermometer to measure the temperature in the jacket. The top of the column was connected to the condenser by an adapter with a 45° side arm. An 8 mm I.D. closed end tube was positioned at the top of the adapter so that the tip of the tube was at the center of the side arm. This tube served as a sleeve for an iron/constantan thermocouple which was used to measure the head temperature. The condenser was an 18 inches long, ¾ inch I.D. water jacketed Teflon ® tube with a 45° adapter connecting the condenser to a 250 ml Teflon ® dropping funnel which served as a receiver. All the connections between the distillation flask, column, condenser and receiver were made with standard taper joints held in place with syringe clamps.

Three hundred and five parts of hydrogen fluoride, (commercial anhydrous), was charged to the distillation flask and 1.3 parts of 70% hydrogen peroxide was added from a syringe using a hypodermic needle to penetrate the Teflon ® septum. 7.5 parts of 97% sulfuric acid was then added in a similar manner and the solution was stirred for one and a half hours maintaining the temperature in the range 9° to 12° C. The solution temperature was increased to 19.6° C and with the column jacket adjusted to 22° C and the condenser jacket to 4° C, distillation of HF was commenced. After collecting 27 parts of HF the receiver was changed and 97 parts of HF was distilled in two hours, gradually increasing the temperature in the distillation flask to 20.8° C. This distillate was designated fraction A.

The residue in the distillation flask was cooled and kept refrigerated for 18 hours. The temperature of the residual HF, about 180 parts, was increased to 10° C, further additions of 1.3 parts of 70% hydrogen peroxide and 7.5 parts of 97% sulfuric acid were made and the solution was stirred for one hour maintaining the temperature in the range 10.5° to 11.5° C. The temperature in the distillation flask was increased to 21.2° C and with the column jacket adjusted to 22° C and the condenser jacket to 5° C, distillation of HF was commenced. After collecting 13 parts of HF the receiver was changed and 110 parts of HF was distilled in three and a half hours, gradually increasing the temperature in the distillation flask to 28.6° C and the column jacket temperature to 24° C. This distillate was designated fraction B.

Aqueous solutions containing 49% HF were prepared from distilled fractions A and B and analyzed for arsenic and sulfite. The results summarized in Table 2 show that when insufficient $H_2O_2$ and $H_2SO_4$ were used the arsenic content was not decreased sufficiently to meet the electronic grade specification. The addition of more $H_2O_2$ and $H_2SO_4$ to bring the total amount added the minimum required level gave a distilled product in which the arsenic content was less than the specification.

EXAMPLE 7

This exemplifies the treatment of HF with $H_2O_2$ and $H_2SO_4$ wherein the solution is held for twenty two hours before distillation.

The equipment used in Example 6 was used except for the Teflon ® distillation flask for which a 316 stainless steel distillation vessel was substituted and the vessel and the head were as described in Example 1, except that the distillation vessel was 4¼ inches deep instead of 8 inches and a Teflon ® coated magnet was used to stir the contents of the vessel instead of a mechanical stirrer.

To 300 parts of HF (commercial anhydrous) was added 1.3 parts of 70% $H_2O_2$ and 7.5 parts of 97% sulfuric acid by the procedure of Example 6. The solution was stirred at 10° to 12.5° C for 22 hours. Hydrogen fluoride was then distilled at atmospheric pressure as described in Example 6 and 215 parts of anhydrous HF was collected. Arsenic and sulfite plus sulfate analyses on an aqueous solution of the purified HF are shown in Table 2. The arsenic content was below the electronic grade HF specification and the sulfite plus sulfate level was equal to the specification.

TABLE 2

| Ex. No. | % $H_2O_2$ Based on HF | % $H_2SO_4$ Based on HF | Temperature ° C | Hold Time Hr. | Impurities Based on 49% HF | |
|---|---|---|---|---|---|---|
| | | | | | As | $SO_3^{-2}$ + $SO_4^{-2}$ |
| 6 A | 0.30 | 2.4 | 9–12 | 1.5 | 4.3 | — |
| 6 B | 0.80 | 6.4 | 10.5–11.5 | 1 | <0.01 | 5 |
| 7 | 0.75 | 6.3 | 10–12.5 | 22 | 0.02 | 3 |

While the invention has been described in considerable detail in the foregoing, it is to be understood that such detail is solely for the purpose of illustration and that variations can be made by those skilled in the art without departing from the spirit and scope of the invention except as set forth in the claims.

What is claimed is:

1. A process for the preparation of pure anhydrous hydrogen fluoride with reduced arsenic and sulfite impurities consisting essentially of (1) contacting in equipment inert thereto anhydrous hydrogen fluoride having arsenic and sulfite impurities with (a) at least 2.3% by weight of $H_2SO_5$ based on the anhydrous hydrogen fluoride or (b) at least 0.7% by weight based on the anhydrous hydrogen fluoride of hydrogen peroxide and either at least 0.6% by weight of methanol based on the anhydrous hydrogen fluoride or at least 1 mole of sulfuric acid per mole of hydrogen peroxide, at a temperature of from 0° to 75° C, (2) distilling the resulting mixture and (3) recovering a high purity anhydrous hydrogen fluoride with arsenic and sulfite impurities of 0.03 ppm or less and 3 ppm or less respectively.

2. The process of claim 1 wherein the temperature is 0° to 20° C.

3. The process of claim 1 wherein 0.7 to 1.5% of hydrogen peroxide is used.

4. The process of claim 1 wherein 0.6 to 2% of methanol is used.

5. The process of claim 1 wherein 1 to 5 moles of sulfuric acid is used.

6. The process of claim 1 wherein sulfuric acid is used.

7. The process of claim 6 wherein 1.5 to 5 moles of sulfuric acid is used.

8. The process of claim 1 wherein hydrogen peroxide and methanol are used.

9. The process of claim 8 wherein 0.7% to 1.5% of hydrogen peroxide and 0.6% to 2.0% of methanol is used.

10. The process of claim 9 wherein the temperature is from 0° to 20° C.

11. The process of claim 1 wherein $H_2SO_5$ is used.

12. The process of claim 11 wherein 2.3% to 5% of $H_2SO_5$ is used.

13. The process of claim 12 wherein the temperature is from 0° to 20° C.

14. The process of claim 1 wherein hydrogen peroxide and sulfuric acid are used.

15. The process of claim 14 wherein 0.7% to 1.5% of hydrogen peroxide and 1 to 5 moles of sulfuric acid are used.

16. The process of claim 15 wherein the temperature is from 0° to 20° C.

* * * * *

UNITED STATES PATENT OFFICE
CERTIFICATE OF CORRECTION

PATENT NO. : 4,083,941
DATED : April 11, 1978
INVENTOR(S) : MADHUSUDAN DATTATRAYA JAYAWANT and
GEOFFREY WALSH MEADOWS It is certified that error appears in the above-identified patent and that said Letters Patent are hereby corrected as shown below:

Column 8, line 42, "end the passed" should be -- end tube passed --.

Column 8, line 55, "sued" should be -- used --.

Column 8, line 57, after "12 inches" insert "long, 3/4 inch".

Signed and Sealed this

Third Day of October 1978

[SEAL]

Attest:

RUTH C. MASON
Attesting Officer

DONALD W. BANNER
Commissioner of Patents and Trademarks